United States Patent [19]

Dickman et al.

[11] Patent Number: 4,556,951
[45] Date of Patent: Dec. 3, 1985

[54] CENTRAL PROCESSOR WITH INSTRUCTIONS FOR PROCESSING SEQUENCES OF CHARACTERS

[75] Inventors: Lloyd I. Dickman, Sudbury; William D. Strecker, Harvard, both of Mass.

[73] Assignee: Digital Equipment Corporation, Maynard, Mass.

[21] Appl. No.: 540,510

[22] Filed: Jan. 5, 1984

Related U.S. Application Data

[63] Continuation of Ser. No. 386,827, Jun. 6, 1982, abandoned, which is a continuation of Ser. No. 59,038, Jul. 19, 1979, abandoned, which is a continuation of Ser. No. 848,201, Nov. 3, 1977, abandoned.

[51] Int. Cl.$^4$ .............................................. G06F 7/34
[52] U.S. Cl. ...................................... 364/900; 382/40
[58] Field of Search ... 364/200 MS File, 900 MS File; 382/30, 40

[56] References Cited

U.S. PATENT DOCUMENTS

| | | | |
|---|---|---|---|
| Re. 26,429 | 8/1968 | Kaufman et al. | 364/900 |
| 3,267,439 | 8/1966 | Bonner | 340/146.3 WD |
| 3,323,108 | 5/1967 | Mullery et al. | 364/900 |
| 3,435,423 | 3/1969 | Fuller et al. | 364/900 |
| 3,537,076 | 10/1970 | Damerau | 364/900 |
| 3,729,218 | 4/1973 | Dafton et al. | 364/200 |
| 3,737,852 | 6/1973 | Robinson | 340/146.3 WD |
| 3,760,355 | 9/1973 | Bruckert | 340/146.3 WD |
| 3,855,576 | 12/1974 | Braun et al. | 340/146.3 WD |
| 3,964,029 | 6/1976 | Babb | 364/900 |
| 3,969,698 | 7/1976 | Bollinger et al. | 340/146.3 WD |

OTHER PUBLICATIONS

IBM System/360 Principles of Operation Manual, 1964, pp. 15 and 24.
Microcomputer Handbook, Digital Equip. Corp., 1977.

Primary Examiner—Eddie P. Chan
Attorney, Agent, or Firm—Cesari and McKenna

[57] ABSTRACT

A central processor for use in a data processing system that is adapted for processing sequences of characters. Information identifying a string of characters to be examined, including the memory location for the first character in the sequence and the total number of characters in the sequence, is placed in working registers of the central processor. Other working registers in the central processor receive information corresponding to a predetermined characteristic, which may be a specific character or information identifying another character string. One of several character string instructions then can be processed. In response to a typical character string instructuion, the central processor retrieves each character from the memory and compares it with the predetermined characteristic. Processing continues until either the predetermined characteristic is detected or all the characters in the character string are examined. During processing, the central processor controls an arithmetic-logic condition code during each comparison. When the processing terminates, the condition code indicates whether the character string contained the predetermined characteristic.

4 Claims, 15 Drawing Figures

```
           ┌─────────────────────────┐
           │ FIGS. 4A & 4B, STEPS 81 & 95 │
           └─────────────────────────┘
   96                    │
    ┌──────────────────────▼────────────────────────────┐
    │ MOVE THE STATUS INFORMATION FROM THE HIGH-ORDER   │
    │ BYTE IN THE R4 REGISTER TO THE HIGH-ORDER BYTE IN │
    │ THE STATUS REGISTER IN THE REGISTER MEMORY 22 MASK│
    │ THE RETURN CODE IN THE HIGH-ORDER BYTE OF THE     │
    │ STATUS REGISTER                                   │
    └───────────────────────────────────────────────────┘
   97                    │
    ┌──────────────────────▼────────────────────────────┐
    │ CLEAR THE LOW-ORDER BYTE IN THE STATUS REGISTER AND│
    │ THE HIGH-ORDER BYTE IN THE R4 REGISTER            │
    └───────────────────────────────────────────────────┘
```

FIG. 5

FIG. 3, STEP 78

101. COMPARE THE LENGTHS OF THE FIRST AND SECOND CHARACTER STRINGS BASED UPON THE LENGTH NUMBERS STORED IN THE R0 AND R2 REGISTERS IN THE REGISTER MEMORY 22

102. IS THE NUMBER IN THE R0 REGISTER LARGER, INDICATING THAT THE FIRST CHARACTER STRING IS LONGER? —NO→ FIG. 6C-1 STEP 144

YES ↓

103. MOVE THE LENGTH OF THE SECOND CHARACTER STRING, THE SHORTER CHARACTER STRING, INTO THE SOURCE REGISTER IN THE REGISTER MEMORY 22

104. ESTABLISH INTERRUPTION RETURN INFORMATION

FIG. 6A-2 STEP 114B

105. DECREMENT THE STRING LENGTH NUMBER THAT IS STORED IN THE R2 REGISTER IN THE REGISTER MEMORY 22

106. HAS THE ENTIRE SECOND CHARACTER STRING BEEN COMPARED [I.E., DOES THE R2 REGISTER CONTAIN A ZERO (0)]? —YES→ FIG. 6B STEP 120

NO ↓

110. MOVE THE CHARACTER IDENTIFIED BY THE ADDRESS CONTAINED IN THE R3 REGISTER INTO THE LOW-ORDER BYTE OF THE BA REGISTER IN THE REGISTER MEMORY 22

111. MOVE THE CHARACTER IDENTIFIED BY THE ADDRESS CONTAINED IN THE R1 REGISTER INTO THE HIGH-ORDER BYTE OF THE STATUS REGISTER IN THE REGISTER MEMORY 22

FIG. 6A-2, STEP 112

FIG. 6A-1

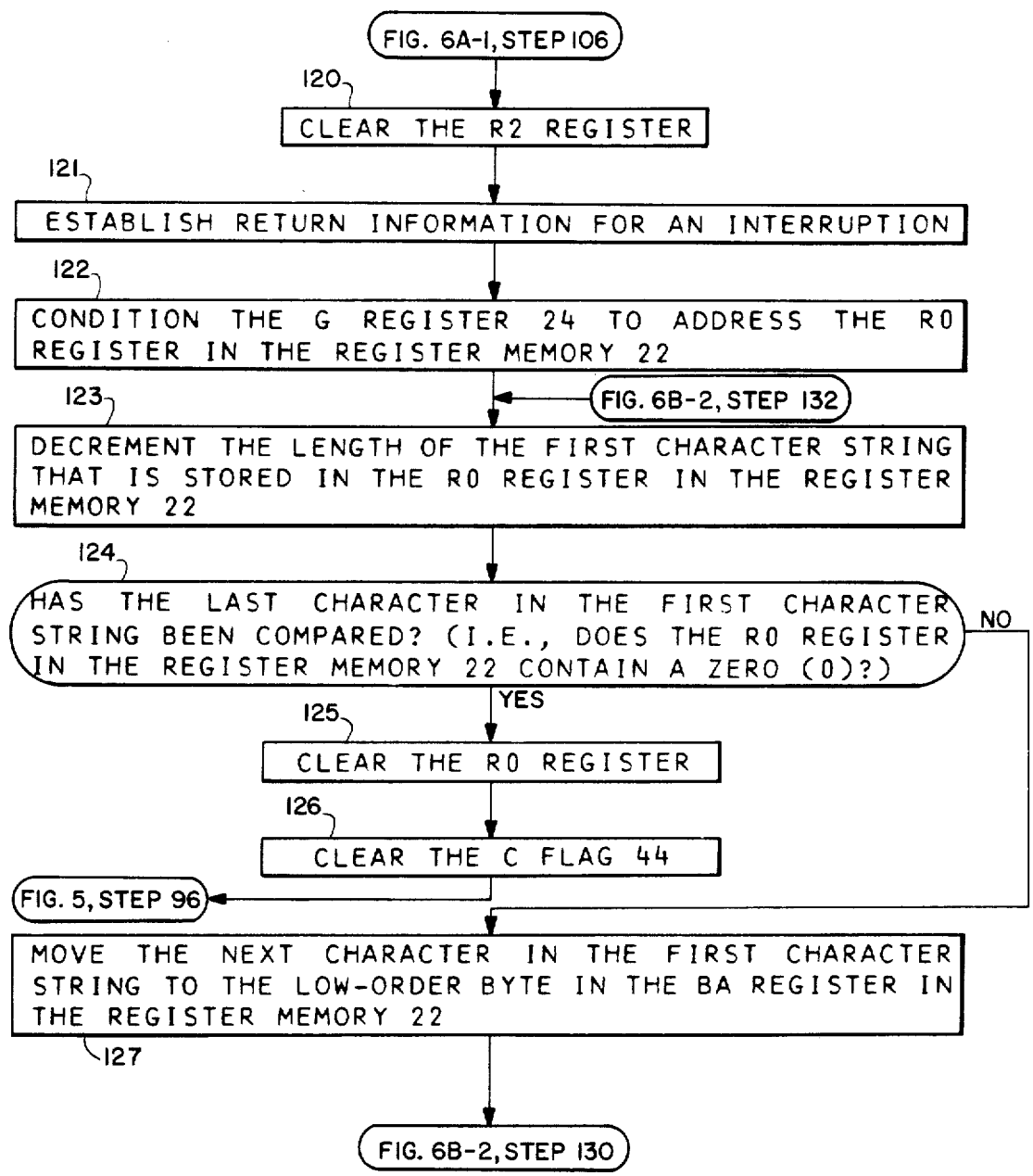
FIG. 6B-I

FIG. 6A-1, STEP 102
↓
144. ESTABLISH INTERRUPTION ROUTINE INFORMATION
↓
145. DECREMENT THE LENGTH OF THE FIRST ◀──────┐
CHARACTER STRING IN THE R0 REGISTER
IN THE REGISTER MEMORY 22
↓
146. HAS THE ENTIRE SECOND CHARACTER
STRING BEEN COMPARED [I.E. DOES THE      YES
R0 REGISTER IN THE REGISTER MEMORY   ──────▶ FIG. 6D
CONTAIN A (0)]?                              STEP 160

NO  ↓

150. MOVE THE CHARACTER IDENTIFIED BY
THE ADDRESS CONTAINED IN THE R1 REGISTER
INTO THE LOW-ORDER BYTE OF THE BA REGISTER
IN THE REGISTER MEMORY 22
↓
151. MOVE THE CHARACTER IDENTIFIED BY
THE ADDRESS CONTAINED IN THE R3 REGISTER
INTO THE HIGH-ORDER BYTE OF THE STATUS
REGISTER IN THE REGISTER MEMORY 22
↓
152. ARE THERE ANY INTERRUPTIONS          NO
TO BE SERVICED?                        ─────┐
                                            │
    YES ↓                                   │
                                            │
153. PERFORM INTERRUPTION SERVICE ──────────┘
         ↓
                                          NO     FIG. 6C-2
154A. ARE THE TWO CHARACTERS        ──────────▶ STEP 155
IDENTICAL?

YES ↓

154B. ADJUST THE ADDRESSES CONTAINED ─────────┘
IN THE R1 AND R3 REGISTERS TO IDENTIFY
THE NEXT CHARACTERS IN THE CHARACTER STRINGS

FIG. 6C-1

FIG. 6C-1, STEP 154A

155. DECREMENT THE ADDRESSES FOR THE
CHARACTERS IN THE FIRST AND SECOND CHARACTER
STRINGS THAT ARE STORED IN THE R1 AND R3
REGISTERS OF THE REGISTER MEMORY 22 RESPECTIVELY.

156. INCREMENT THE LENGTHS FOR THE FIRST
AND SECOND CHARACTER STRINGS THAT ARE
STORED IN THE R0 AND R2 REGISTERS OF
THE REGISTER MEMORY 22 RESPECTIVELY

FIG. 7    SCAN INSTRUCTION
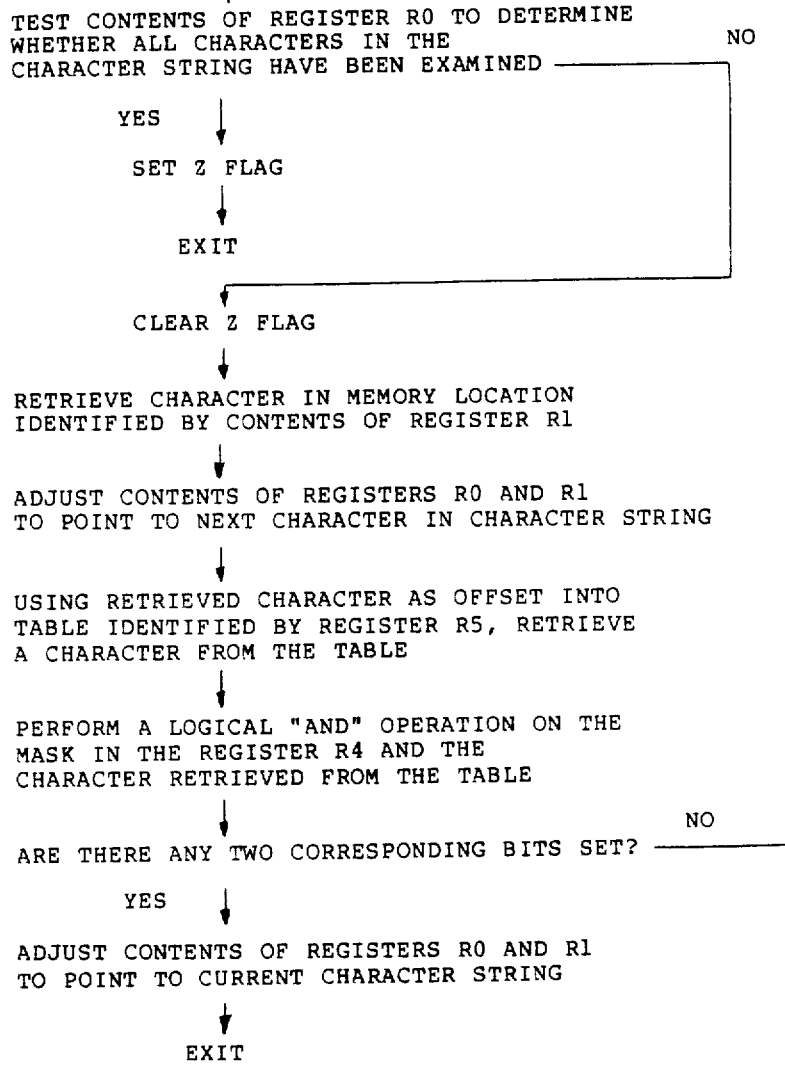

CENTRAL PROCESSOR WITH INSTRUCTIONS FOR PROCESSING SEQUENCES OF CHARACTERS

This application is a continuation of Ser. No. 386,827, filed June 6, 1982, now abandoned, which is a continuation of Ser. No. 06/059,038, filed 7/19/79 now abandoned, which is a continuation of Ser. No. 05/848,201, filed 11/3/77, now abandoned.

CROSS REFERENCES TO RELATED U.S. PATENTS AND PUBLICATIONS

U.S. Pat. No. 3,614,740 issued Oct. 19, 1971 for DATA PROCESSING SYSTEM WITH CIRCUITS FOR TRANSFERING BETWEEN OPERATING ROUTINES, INTERRUPTION ROUTINES AND SUBROUTINES and assigned to the same assignee as the present invention;

U.S. Pat. No. 3,614,741 issued Oct. 19, 1971 for DATA PROCESSING SYSTEM WITH INSTRUCTION ADDRESSES IDENTIFYING ONE OF A PLURALITY OF REGISTERS INCLUDING THE PROGRAM COUNTER and assigned to the same assignee as the present invention;

U.S. patent application Ser. No. 05/848,202filed on even date herewith for a CENTRAL PROCESSOR WITH MEANS FOR SUSPENDING INSTRUCTION OPERATION and assigned to the same assignee as the present invention; and

*Microcomputer Handbook*, Digital Equipment Corporation, 1977.

BACKGROUND OF THE INVENTION

This invention generally relates to data processing systems and more specifically to a central processor that is adapted for processing data in the form of extended sequences of characters.

A conventional central processor for a data processing system has a characteristic instruction set that includes program control instructions and arithmetic-logic instructions. Branch instructions and jump instructions are examples of program control instructions. Instructions for performing addition, substraction, logical AND, logical OR, and similar functions are examples of arithmetic-logic functions.

When a central processor executes an arithmetic-logic instruction, it sets or clears various flags that indicate certain characteristics of the resulting arithmetic-logic operation. In the PDP11 central processor described in U.S. Pat. No. 3,614,740 and 3,614,741 and the *Microcomputer Handbook*, these include a Z flag, an N flag, a V flag and a C flag. The Z flag is set if an arithmetic-logic result is zero; the N flag is set if the result is negative; the C flag is set if the operation results in a carry from the most significant bit or if a ONE is shifted from the most or least significant bits; and the V flag is set if the operation results in an arithmetic overflow. These flags are useful in ascertaining certain characteristics of individual arithmetic-logic operations.

A conventional central processor also responds to a particular one of its arithmetic-logic instructions by processing information in units of fixed length. For example, the PDP11 central processor described in the foregoing patents and publication, processes either data "words" that are constituted by two eight-bit "bytes" or single data bytes. Although this format of data organized into fixed-length bytes and words normally is adequate for arithmetic-logic operations, there are many applications arising for data processing systems which require more sophisticated processing of data. Applications for computer-assisted editing of programs by programmers or of textual material by publishers and by office personnel who utilize word processing equipment are examples. In these applications the data comprises sequences of many characters. Generally each character is stored at one byte location in a memory and all the characters are stored in a sequence of consecutive byte locations. A sequence of characters is called a "character string".

As conventional PDP11 and similar central processors are limited to processing one word, or some limited number of words, during each instruction, fairly complex subroutines must be written with the available intructions in order to process character strings. Indeed a number of character string functions have been implemented using subroutines. Two general types of subroutines are of interest with respect to this invention. One type includes comparison subroutines for determining the whether two character strings are identical. The other type includes subroutines which determine whether a character string includes a specific character or group of characters.

The necessity for implementing these functions with subroutines reduces the rate at which the character strings can be processed and also complicates the programs. Any complication in programming also leads to errors which then must be found and corrected.

Therefore there is an object of this invention to simplify the analysis of a character string in a data processing system.

Another object of this invention is to provide a central processor that includes specific machine instructions for processing character strings.

Still another object of this invention is to provide a machine instruction for a central processor that enables the processor to analyze a character string to determine whether it conforms to some predetermined characteristic.

Yet another object of this invention is to provide a machine instruction for a central processor that enables the central processor to compare two distinct character strings to determine whether they are identical.

SUMMARY OF THE INVENTION

In accordance with this invention, the central processor responds to a predetermined set of character string instructions. As a programmer writes a program that will include an analysis of the character string, he utilizes conventional arithmetic-logic instructions to store, into working registers of the central processor, information that defines a predetermined characteristic plus the character string to be examined. He then writes a single character string instruction that corresponds to a desired function. In response to the character string instruction the central processor retrieves successive characters in the string being examined and compares these characters with the predetermined characteristic. Processing continues until either the predetermined characteristic is detected or all the characters in the character string are retrieved. One condition code then indicates whether the predetermined characteristic has been detected in the character string; that is, whether the test defined by the instruction has been met with success or failure. Thus, the programmer can utilize conventional program control instructions for testing that condition code thereby to control subsequent processing. Moreover the contents of the working registers specify the location at which the predetermined characteristic was detected, so that information is available immediately.

This invention is pointed out with particularity in the appended claims. The above and further objects and advantages of this invention may be better understood by referring to the following detailed description taken in conjunction with the accompanying drawings.

BRIEF DESCRIPTION OF THE DRAWINGS

FIG. 5 defines specific operations of the central processor shown in FIG. 1 upon the completion of the steps that are defined in FIG. 4 or of corresponding steps that are taken in response to analagous instructions;

FIGS. 6A-1, 6A-2, 6B-1, 6B-2, 6C-1, 6C-2 and 6D define the operation of the central processor in FIG. 1 in response to another character string searching instruction; and FIG. 7 defines the operation of the central processor in FIG. 1 in response to yet another character string searching instruction.

DESCRIPTION OF AN ILLUSTRATIVE EMBODIMENT

General Discussion

Figure 1:
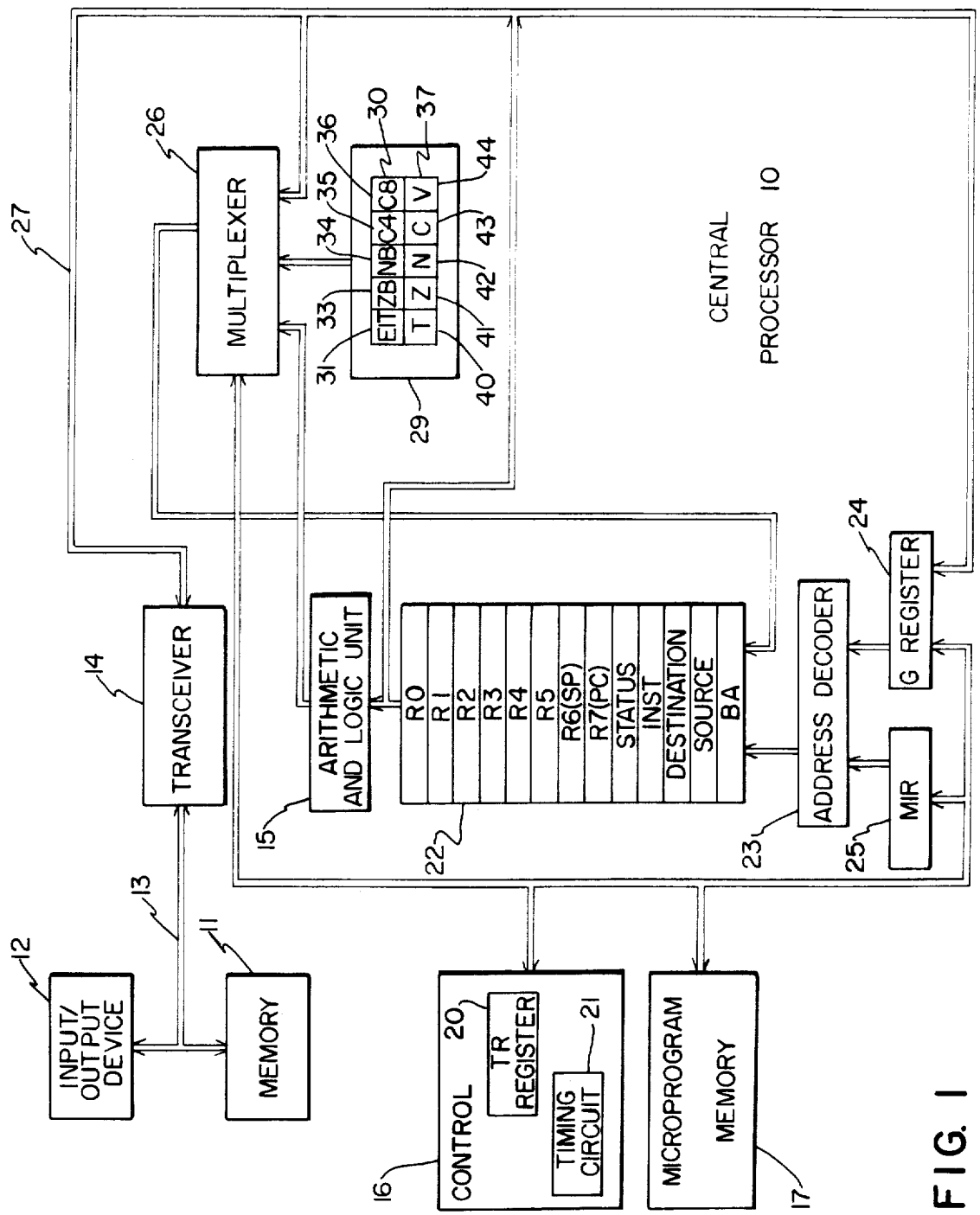
FIG. 1 is a block diagram of a central processor that is adapted for operating in accordance with this invention.

Before describing a specific embodiment of this invention, it will helpful to discuss generally several instructions for detecting whether a predetermined characteristic is found in a character string. There are several instructions which are beneficial in examining character strings to determine whether they contain a predetermined characteristic. Each instruction modifies condition codes depending upon whether the instruction succeeds or fails in detecting the predetermined characteristic. Thus, the condition codes provide a consistent indication of success or failure of the test performed by the instruction after the character string is processed. In accordance with this invention the mnemonics for these instructions and their functions are as follows:

1. LOCC: Locate the position and address of the first occurrence of a predetermined character in the character string;
2. SKPC: Locate the position and address of the first occurrence of a character in the character string that does not correspond to a predetermined character;
3. SCANC: Locate the position and address of the first occurrence of any character that is within a predetermined set of characters;
4. SPANC: Locate the position and address of the first occurrence of any character that is not within a predetermined set of characters;
5. MATCHC: Locate the position and address of the first character following a predetermined sequence of characters; and
6. CMPC: Locate the position and address of the first corresponding characters in two character strings that are not identical.

Specific information must be made available in order for a central processor to process a character string in response to any of these instructions. For example, the locations of the character string in memory must be specified for each of the instructions. It also is necessary to specify the character or character set for each of the LOCC, SKPC, SPANC and SCANC instructions. A second character string must be specified for the MATCHC and CMPC instructions.

Although there are several approaches for identifying a character string in memory, this specific implementation utilizes two items of information: namely, the address for the initial, or most significant, character in the character string and the length of the character string. A single character can be specified directly in the program by the programmer. A predetermined set of characters can be identified an address in a memory table and an access mask.

In accordance with a specific embodiment of this invention, these, and other character string instructions that form no part of this invention, are added to the conventional set of instructions that the central processor can process. Therefore, these instructions utilize operation codes that have not been assigned previously. Within the presently available operation codes it is not possible to identify the character string and characteristic in a single instruction. Therefore, each instruction assumes that information specifying the character string and characteristic have been transferred into predetermined working registers prior to processing the instruction itself. In a PDP11 central processor the length and starting address for a character string are transferred to the R0 and R1 registers respectively. If a LOCC or SKPC instruction is to be processed, the predetermined character is stored in the R4 register: If a SCANC or SPANC instruction is to be processed, a mask is stored in the R4 register and the table address is stored in the R5 register. For a MATCHC instruction, the predetermined character string is identified by information in the R0 and R1 registers and is called the "object" string; the character string to be examined is called the "source" string and its length and starting address are stored in the R2 and R3 registers, respectively. For a CMPC instruction, the R0 and R1 registers contain the length and starting address for one character string; the R2 and R3 registers, the length and starting address for the other character string.

With this understanding of the basic function of each instruction, it now will be helpful to discuss generally the central processor shown in FIG. 1 before further discussing the operation of any specific instruction. FIG. 1 is a block diagram of a central processor 10 that is sold by the assignee of this invention as an PDP11/03 microcomputer that is described in the previously identified *Microcomputer Handbook*.

During operation the central processor 10 communicates with a random access memory 11 and peripheral devices represented by an input/output device 12 over a bus 13 that connects to a transceiver 14 in the central processor 10. The heart of the central processor 10 is an arithmetic-logic unit 15 and a control unit 16. U.S. Pat. Nos. 3,614,740 and 3,614,741 disclose a control unit implemented in combinatorial logic. In recent years control units comprising microprogram responsive controllers and microprogram memories have replaced combinatorial logic as a means for establishing data paths in a central processor because microprogrammed controllers are easier to construct, are more flexible and are less expensive to implement. Thus, the data paths in the central processor 10 shown in FIG. 1 are established by such a microprogrammed controller including a control unit 16 and a microprogram memory 17. The control circuit 16 includes a TR register 20 and a timing circuit 21 that establishes the sequence of events in accordance with FIGS. 2 through 6D. Although FIGS. 2 through 6D define specific sequences of data transfers within the central processor 10, it will become apparent that different sequences can also be used to implement this invention.

The arithmetic-logic unit 15 receives data from a register memory 22 and specifically from a register identified by an address supplied to an address decoder 23. The address is supplied either from a G register 24 or an MIR register 25. The G register 24 receives its addresses from the register memory 22 or the transceiver 14, as defined by the control unit 16 and microprogram memory 17, and it specifies the R0 through R7 registers defined in the foregoing U.S. Patents. Addresses from the MIR register 25 identify other registers that are utilized as scratch pad registers by the central processor 10. As shown, these registers are identified as BA, SOURCE, DESTINATION, INST and STATUS registers respectively. The MIR register 25 also can address the R6 and R7 registers, so there is an overlap of the registers addressed by the G register 24 and the MIR register 25.

The output from the arithmetic-logic unit 15 passes through a multiplexer 26 back into a designated register in the register memory 22. It is also possible for data to be supplied into the register memory 22 through the multiplexer 26 from an internal bus 27 that connects to the transceiver 14 and from a flag circuit 30. All transfers to the transceiver 14 are from the register memory 22. All the foregoing operations are in the proper sequence by the control circuit 16 operating in conjunction with the microprogram memory 17.

The central processor 10 includes two basic sets of flags. One set 30, designated as "microprocessor flags", includes an enable interrupt test (EIT) flag 31 that enables the suspension of the character string instructions as described in our co-pending U.S. patent application Ser. No. 05/848,202. The microprocessor flags also include microprocessor condition code flags identified specifically as a ZB flag 33, NB flag 34, C4 flag 35 and a C8 flag 36. These flags are responsive to specific microcode instructions and represent the state of the previous result from the arithmetic-logic unit 15 in response to a specific microcoded instruction. The ZB flag 33 indicates whether the result was zero; the NB flag 34, whether the high-order bit from the operation was a ONE; the C4 flag 35, whether a carry from bit position 3 occurred; and the C8 flag 36 whether a carry from position 7 occurred. Another set of flags 35 correspond to the conventional central processor flags found in a PDP11 central processor. As known, these flags include the T flag 40, Z flag 41, N flag 42, V flag 43 and C flag 44.

With this understanding of the basic structure and operation of the central processor 10, we shall describe the logical operation of central processor 10 in response to each of the foregoing character string instructions.

1. LOCC instruction:

In response to the LOCC instruction, the central processor 10 uses the arithmetic-logic unit 15 to undergo a sequence of iterative operations. During each iteration, the central processor 10 initially tests the R0 register to determine whether all the characters in the character string have been examined. If they have, the Z flag 41 in the processor flag set 37 is set; otherwise it is cleared. Assuming that characters are still to be retrieved, the central processor 10 retrieves the next character in sequence and compares it with the designated character in the R4 register. If the characters are identical, no further iterations occur. When the iterations terminate, the Z flag 41 indicates whether the instruction has succeeded in locating the predetermined character (the Z flag 41 is set) or has failed to locate the character (the Z flag 41 is cleared). Therefore, the programmer can simply use BNE or BEQ instructions to control subsequent operations. Moreover, if the predetermined character has been found, the R0 and R1 registers identify its position in the string and its location in the random access memory 11.

2. SKPC instruction:

During each iteration of the central processor 10 in response to the SKPC instruction, the central processor 10 initially tests the R0 register to determine whether all the characters in the character string have been examined. If they have, the Z flag 41 is set; otherwise it is cleared. Assuming that characters are still to be retrieved, the central processor 10 retrieves the next character in sequence and compares it with the designated character in the R4 register. If the characters are different, no further iterations occur. When the iterations terminate, the Z flag 41 indicates whether the instruction has not located a character in the character string other than the predetermined character. In this case, success is indicated by setting the Z flag 41. Therefore, the programmer can simply use the BNE and BEQ instructions to control subsequent operations. Moreover, if a character other than the predetermined character has been found, the R0 and R1 registers identify its position in the string and its location in the random access memory 11.

3. SCANC instruction:

The code for each character constitutes an offset into the table identified by the R5 register. During each iteration the central processor tests the R0 register to determine whether all the characters in the character string have been examined. If they have, the Z flag 41 is set; otherwise it is cleared. Assuming that characters are still to be retrieved, the central processor 10 retrieves the next character in sequence. It then combines the corresponding entry in the table with the mask in the R4 register in a logical AND operation. If any two corresponding bits are set, the iterations terminate. If the Z flag 41 is set when the iterations terminate, the instruction has failed to locate a character in the character string that is in the same set of characters defined by the mask in the R4 register. If the Z flag 41 is cleared, success is indicated. Therefore, the programmer can simply use the BNE and BEQ instructions to control subsequent operations. Moreover, if a character in the predetermined character set has been found, the R0 and R1 registers identify its position in the string and its location in the random access memory 11.

4. SPANC instruction:

The code for each character constitutes an offset into the table identified by the R5 register. During each iteration the central processor tests the R0 register to determine whether all the characters in the character string have been examined. If they have, the Z flag 41 is set; otherwise it is cleared. Assuming that characters are still to be retrieved, the central processor 10 retrieves the next character in sequence. It then compares the corresponding entry in the table with the mask in the R4 register. Unless any two corresponding bits are set, the iterations terminate. If the Z flag 41 is set when the iterations terminate, the instruction has succeeded in only locating characters in the character string that were not in the set of characters defined by the mask in the R4 register. If the Z flag 41 is cleared, failure is indicated. Therefore, the programmer can simply use the BNE and BEQ instructions to control subsequent operations. Moreover, if a character was found that was not in the predetermined character set, the R0 and R1 registers identify its position in the string and its location in the random access memory 11.

5. MATCHC instruction:

During each iteration the central processor tests the R2 register to determine whether all the characters in the source character string have been examined. If they have, the Z flag 41 is set; otherwise it is cleared. Assuming that characters are still to be retrieved, a character from the source character string is compared with the first character in the object character string. If the two characters are different, the next character in the source character string is retrieved. If they are identical, the next characters in both strings are compared. If identities continue to be found, the iterations will terminate when all the characters in the object string have been matched. If two characters are not equal, the object and source strings are reset to a the next character in the source string following the beginning of the identical characters and the first character in the object string. When the iterations terminate, the Z flag 41 indicates whether the instruction has been successful in locating consecutive characters in the source character string that match the object character string. Therefore, the programmer can use the BNE and BEQ instructions to control subsequent operations. Moreover, if such a group of consecutive characters has been found, the R2 and R3 registers identify its position in the string and its location in the random access memory 11.

6. CMPC instruction:

Two distinct character strings are compared to determine whether the characters in corresponding positions in each string are identical. During each successive iteration, the central processor 10 determines whether all the characters in the longer of the two strings have been retrieved. The N, Z, V, and C flags 41 to 44 specify the relative ordering of the two character strings. If corresponding positions in the character strings contain different characters, the location of these characters in their respective strings and their addresses in the memory 11 are specified by the contents of the R0 through R4 registers. If the two character strings are identical, then the Z flag 41 is set to imply success; otherwise the Z flag 41 is cleared to imply failure. Again the programmer used the BNE and BEQ instructions to test that success or failure.

From the foregoing description, it will be apparent that these specific instructions enable a programmer simply to analyze a character string to detect a predetermined characteristic of that string. In accordance with this invention, success or failure to detect a predetermined condition is reflected in the central processor condition codes which normally are used to indicate properties of arithmetic-logical operations. This greatly simplifies subsequent program control. Moreover, specific information concerning the location of the detected characteristic in the character string also is readily available in working registers of the central processor 10 when it completes processing that instruction. It also will be apparent that these instructions can process character strings of considerable length. In the PDP11 central processor the working registers have sixteen bit positions. Therefore, a programmer can process a character string having a length up to $2^{16}$ bit positions, or 64K (K=1024) characters by specifying initially the information and then utilizing the appropriate one of the specific character string instructions.

SPECIFIC DISCUSSION

The specific implementation of the LOCC and CMPC instructions in an LSI11 central processor is shown in the flow diagrams of FIGS. 2 through 6D. These Figures and following description define the transfers of data and logical decisions which occur during the processing of these specific character string instructions. They also specify the order, and hence the timing, of the transfers and provide a complete description that will enable anyone of ordinary skill in the art to adapt to any central processor to implement this invention either in a microprogram controlled central processor or a central processor controlled by combinatorial logic.

Figures 2, 6A:
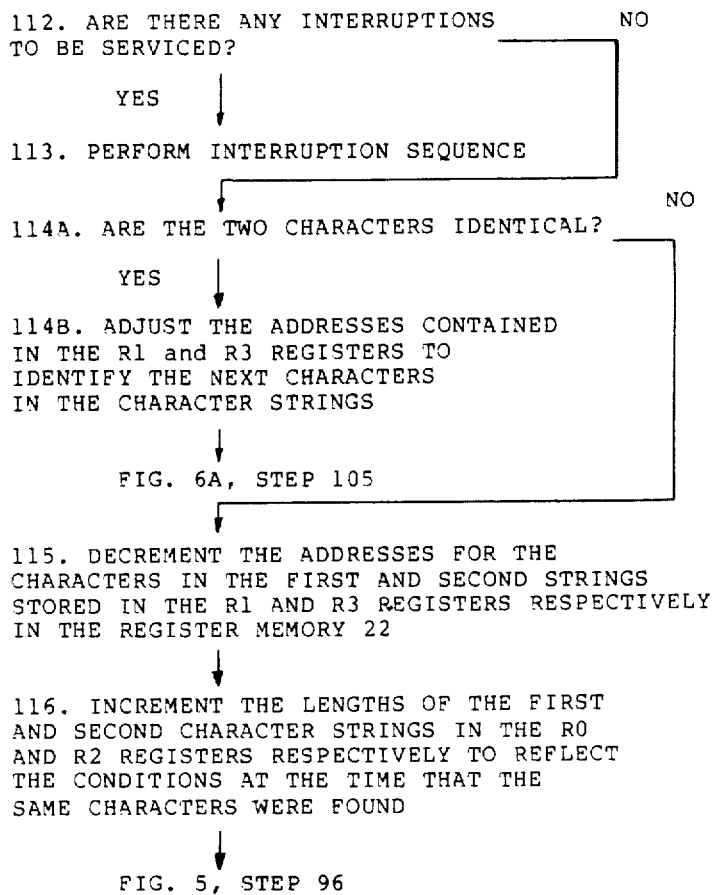

Now referring to FIGS. 1 and 2, operations begin in step 50 by initializing the central processor 10 in a conventional manner. In step 51, the operation for fetching an instruction from the memory 11 begins by moving the contents of the R7 register as an instruction address through the transceiver 14 onto the bus 13. This transfer initiates a reading operation in the memory 11. The address from the R7 register additionally is altered in the arithmetic-logic unit 15 to the address of the next memory location in sequence and then transferred back to the R7 register in the register memory 22.

Once the memory 11 retrieves the information from the addressed location, the central procesor 10 transfers, in step 52, this information through the transceiver 14 and into both the TR register 20 in the control unit 16 and the INST register in the register memory 22. The information in the source register descriptor portion of the instruction (a ZERO in each character string instruction) also is transferred into the G register 24 during step 52. Upon completion of step 52, the G register 24 identifies the R0 register in the register memory 22. In step 53 the control 16 translates the instruction in the TR register 20. If the instruction is not one of the character string instructions, then the control 16, in step 54, diverts to step 55 which represents the microprograms for processing conventional LSI11 instructions.

In a normal program, the central processor 10 would transfer information to the specific registers in the register memory 22 in response to conventional instructions (e.g., a MOV instruction) immediately before retrieving and processing a character string instruction. Once the character string instruction is retrieved, the control unit 16 shifts operations to central processor 10 to step 56 whereby the central processor 10 tests the low-order instruction byte in the INST register. The character string instructions lie within a predetermined numerical range of operation codes that are distinguished by the contents of low-order byte on the INST register. All the character string instructions have the same high-order byte. Moreover, each of these instructions is identified uniquely within the set by one particular character and that character is then moved into the high-order byte position of the INST register in the register memory 22 in step 57.

The control unit 16 places a constant in a low order byte of the STATUS register in the register memory 22 during step 60. This information is used if the instruction is suspended while processing an interruption as described in U.S. patent application Ser. No. 05/848,202.

Figure 2A:
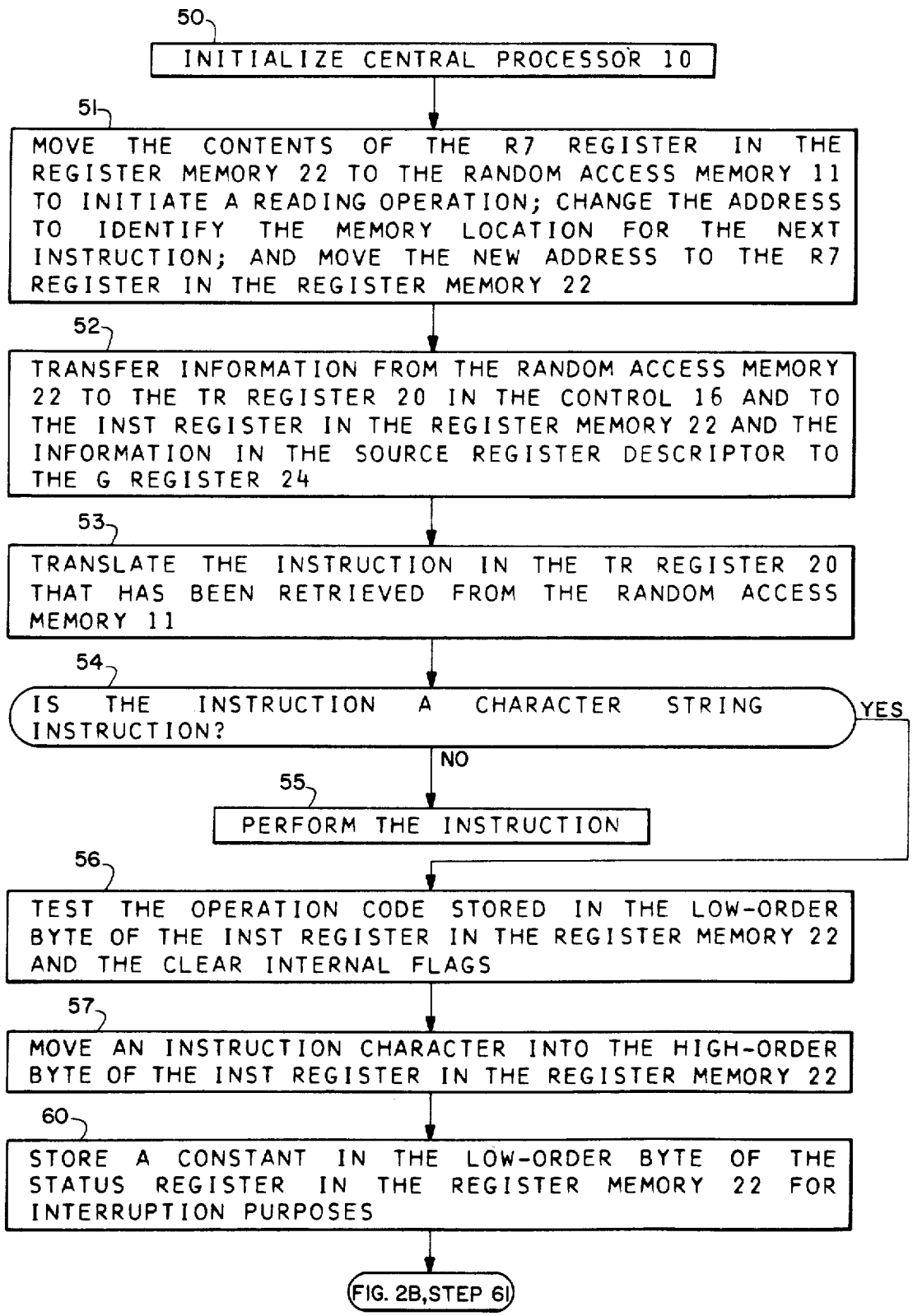
FIGS. 2A and 2B constitute a flow diagram that describes the operation of the central processor in FIG. 1 during the retrieval of instructions from memory.
Figure 2B:
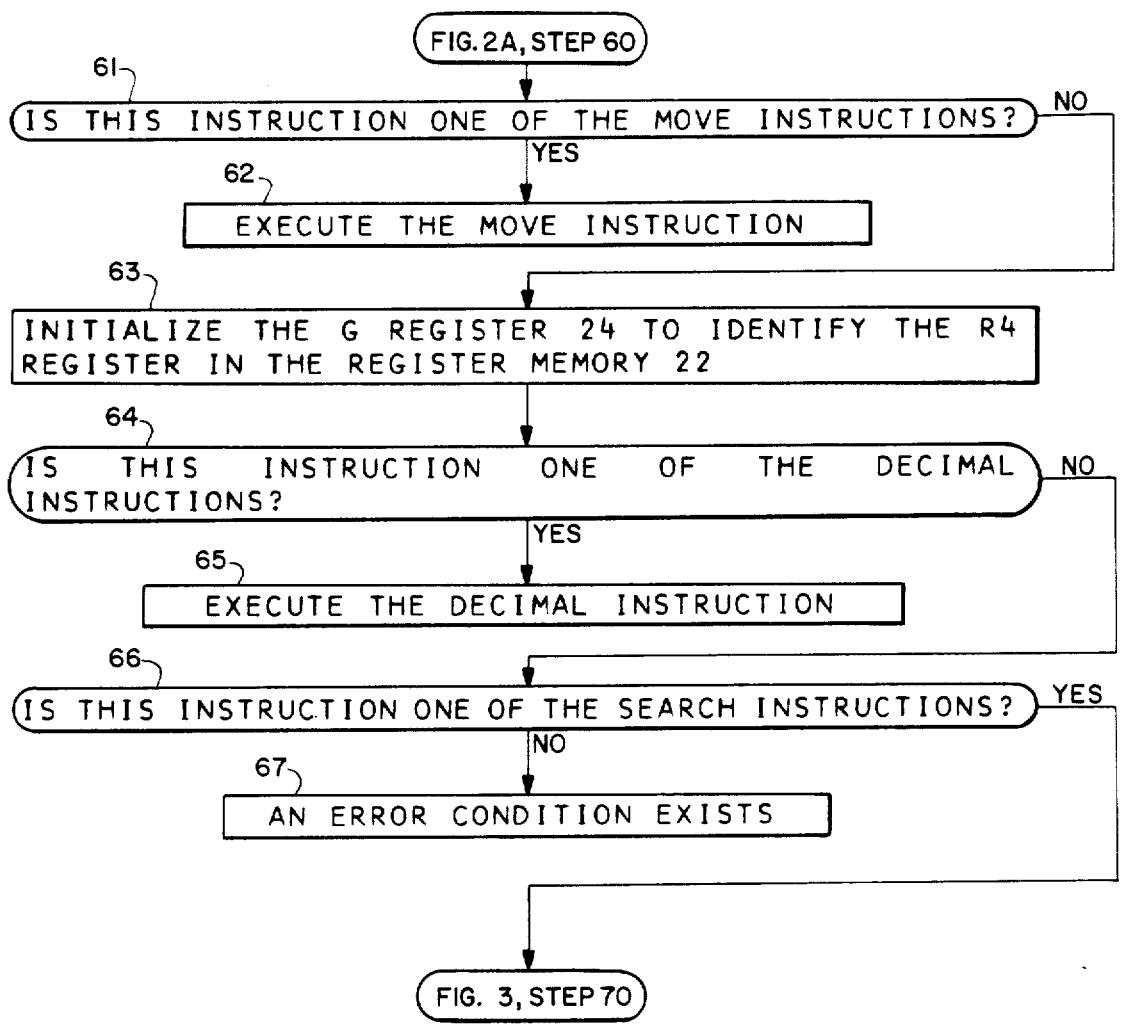

The character string instructions are decoded in steps 61 through 67 in FIG. 2B. If the instruction is one that moves a character string to a new location in memory it is decoded and processed on steps 61 and 62. If the instruction is any other character string instruction such as a decimal instruction for processing decimal strings in accordance with an arithmetic function or a search instruction to which this invention relates, the G register 24 receives information that identifies the low-order byte position of the R4 register in step 63. The central procesor 10 decodes and processes decimal instructions in steps 64 and 65. Otherwise it decodes a search instruction in step 66 or an error condition in step 67.

Figure 3:
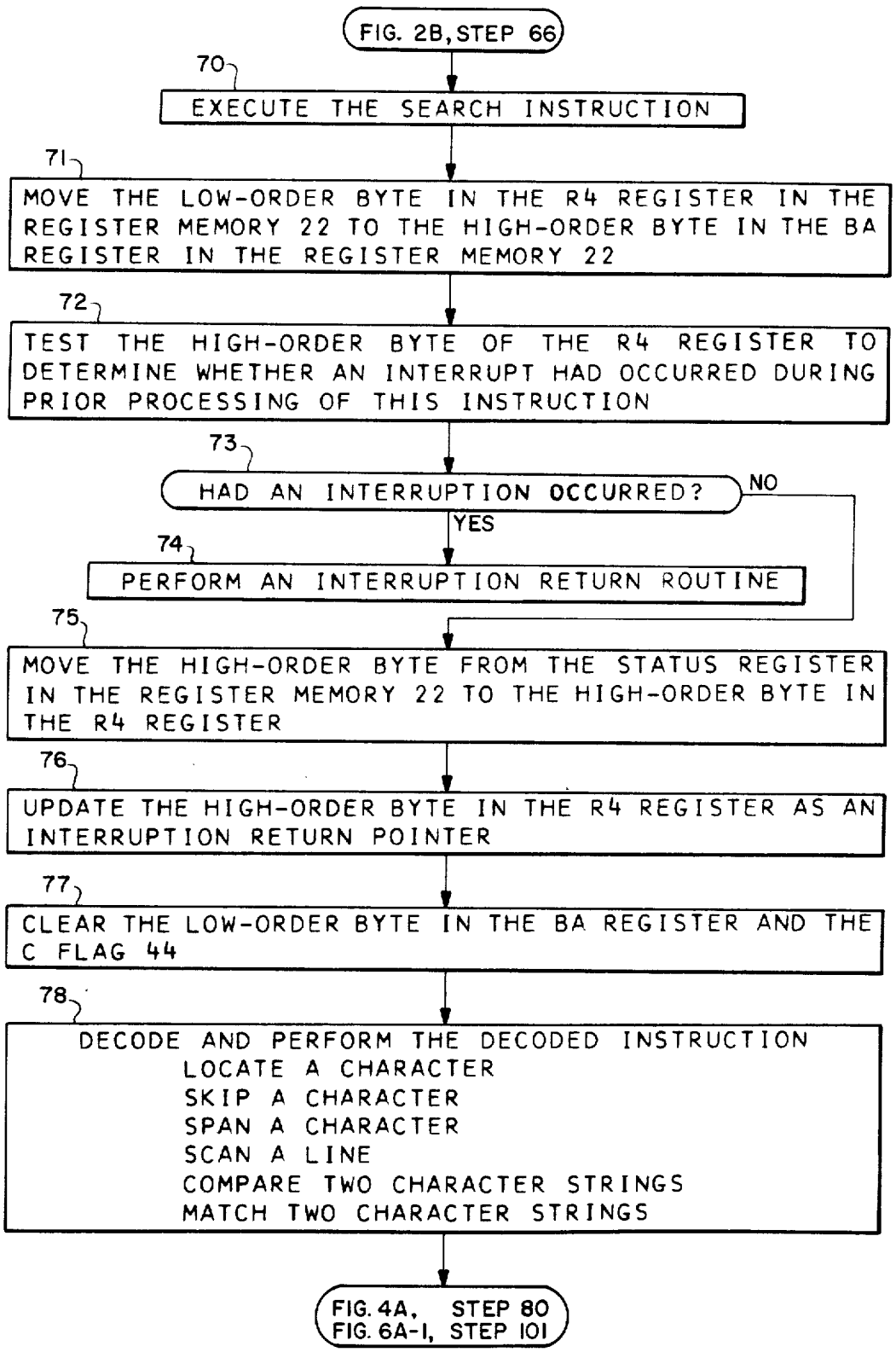
FIG. 3 is a flow diagram that describes the preliminary operation of the central processor in FIG. 1 in response to a character string instruction for searching a character string for a predetermined characteristic.

If a search instruction is retrieved, the central processor 10 diverts to step 70 in FIG. 3 that corresponds to an entry point in the microprogram. Now referring to step 71, the central processor 10 moves the low-order byte of the R4 register to the high-order byte position in the BA register of the register memory 22. Each time the search instruction is processed, the central procesor ascertains whether it had previously been suspended in response to an interruption in step 72. If such an interruption has occurred, then step 73 diverts operation into an interruption return routine which is described in the co-pending U.S. patent application Ser. No. (83-199). If not, the central processor uses step 75 to move the information in the high-order byte position of the STATUS register in the register memory 22 to the high-order byte position in the R4 register, this information constitutes return information to be saved in the event of a subsequent interruption. This return information is updated to a current state in step 76. Step 77, which is processed either after step 76 or upon completion of the interruption return routine in step 74, clears the low-order byte in the BA register and the C flag 44. Then in step 78 the retrieved searching instruction is decoded.

1. LOCC instruction

Figure 4A:
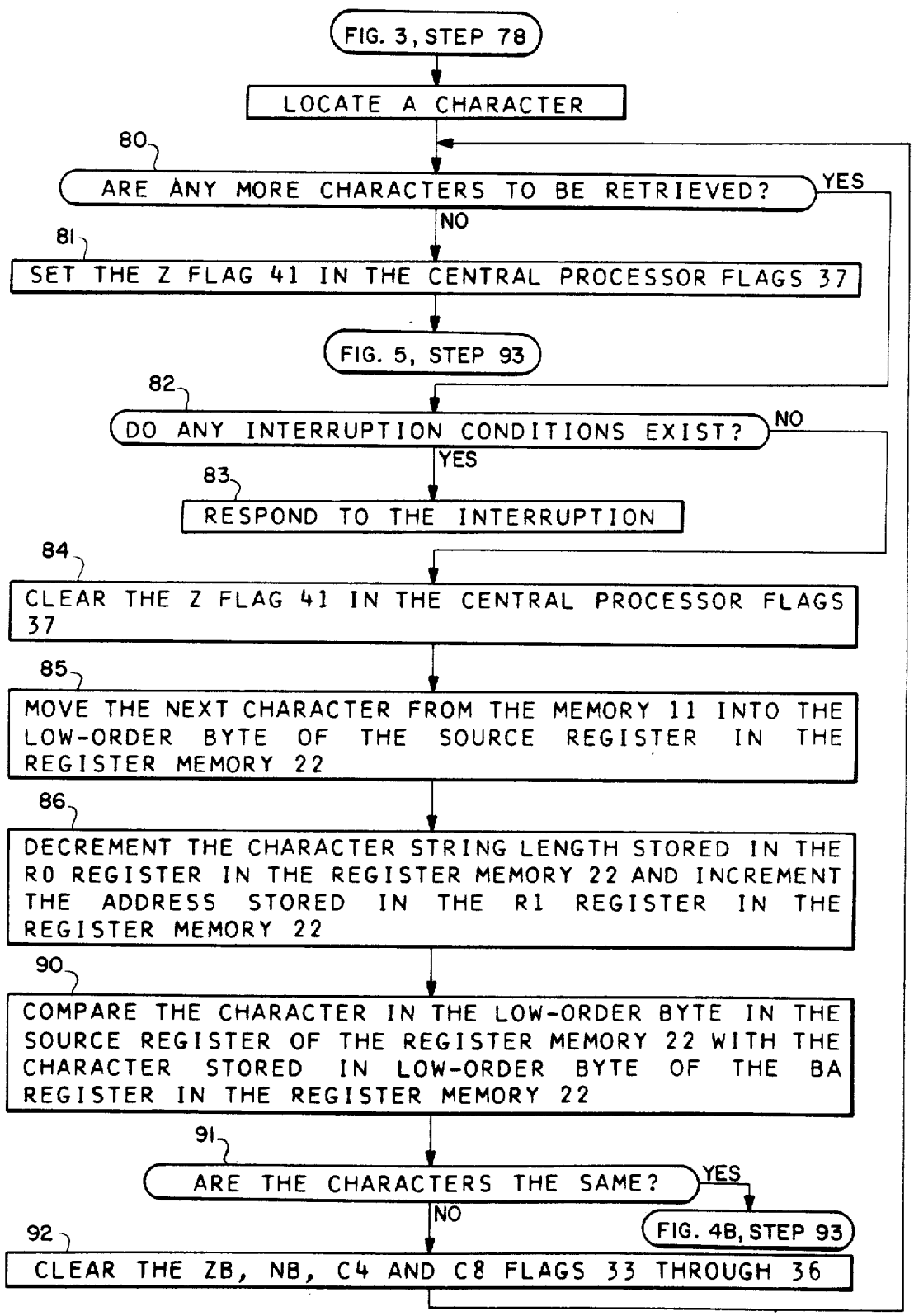
FIGS. 4A and 4B define specific operations of the central processor shown in FIG. 1 in response to a character string search instruction for locating a specific character in a character string.
Figure 4B:
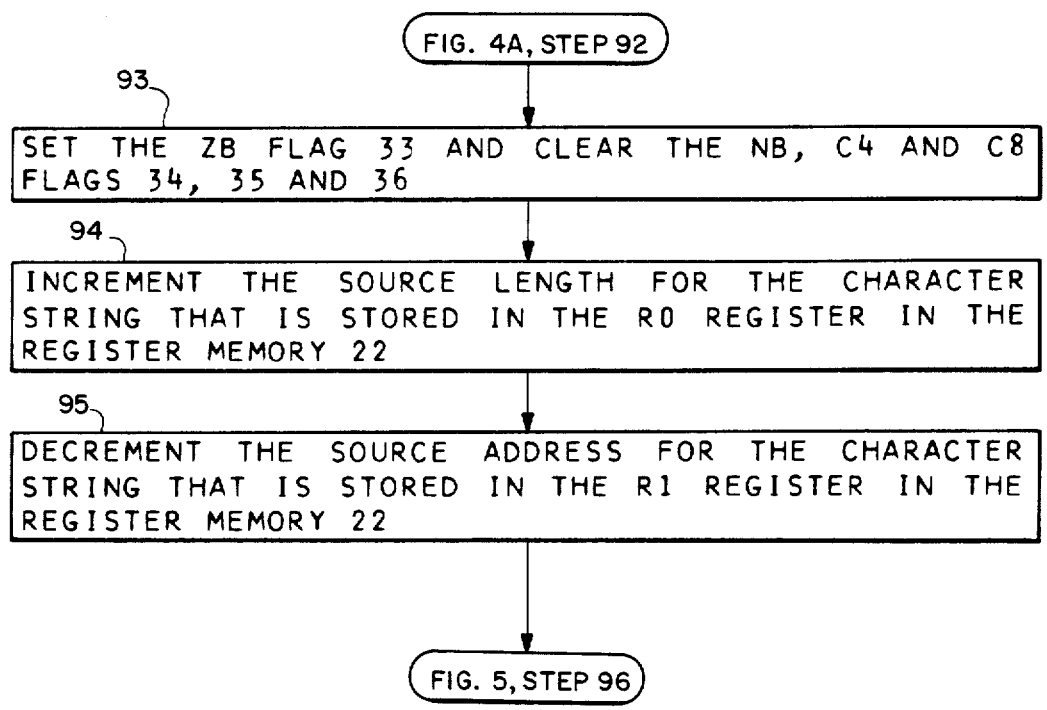

Now referring to FIGS. 1, 4A and 4B, if the decoded character string instruction is a LOCC instruction, the central processor diverts from step 78 to step 80 which is the first step in a character retrieval sequence additionally comprising steps 81 through 86. The central processor 10 uses this same sequence when it processes SKPC, SCANC and SPANC instructions. In step 80 the central processor determines whether any more characters are to be retrieved by testing the R0 register. If no more characters are to be retrieved, then the R0 register contains a ZERO, so this test sets the Z flag 41 (the Z signal is asserted or Z=1) as shown in step 81.

Then the central processor processes the sequence shown in FIG. 5.

If more characters are to be retrieved, step 80 branches to step 82. In step 82, the central processor 10 ascertains whether any interruption conditions exist. If they do, the central processor 10 suspends operation of the LOCC instruction and responds to the interruption in step 83. Upon completion of the interruption, processor operation shifts back to step 74 in FIG. 3 and then returns to step 80 in FIG. 4A whereupon the system normally will divert to step 84 and clear the Z flag 41. In step 85, the central processor moves the next character from the memory 11 to the low-order byte position of the SOURCE register in the register memory 22 for comparison with the predetermined character stored in BA register in the register memory 22. The transfer of the next character in succession from the memory 11 in step 85 also includes step 86 wherein the central processor 10 decrements the character string length stored in the R0 register and increments the character address stored in the R1 register.

In step 90 the central processor 10 compares the two characters. If they are not identical, step 91 diverts to step 92 and clears the ZB flag 33. Then the central processor 10 returns to step 80. Thus, steps 80 through 92 are in a loop that the central processor 10 performs on an iterative basis either until all the characters in the string have been processed (step 82) or the character is found. When a character corresponding to the predetermined character is found, the central procesor 10 utilizes step 93 shown in FIG. 4B to set the ZB flag 33. Then in steps 94 and 95 the source length, stored in the R0 register, is incremented and the source address, stored in the R1 register, is decremented. Thus, when a character is located, the R0 and R1 registers identify respectively, the position of the located character in the character string and its address in memory.

Next the central processor completes it response to the LOCC instruction by performing the sequence depicted in FIG. 5. More specifically, the central processor 10, in step 96, moves the status information in the high-order byte of the R4 register to the corresponding byte in the STATUS register and masks the return code in that byte during the step 96. It then clears the low-order byte of the R4 register in step 97 to assure that it is in an original condition. Then the central processor 10 returns to step 51 in FIG. 2.

Thus, this invention greatly simplifies the programming for locating a predetermined character in a character string. The central processor 10 responds to three conventional operations for transferring character string length, the address in memory of the initial position in the character string and the predetermined character to the R0, R1 and R4 registers, respectively. Then it processes the LOCC instruction for locating the first occurrence of the predetermined character in the string. The next following instruction is a BNE instruction to determine whether the Z flag 41 is set or cleared, as this flag indicates whether the test defined by the instruction (in this case whether the string contains the predetermined character) has been met successfully. More specifically, if a character string does not contain the predetermined character, the R0 register will contain a ZERO and the Z flag 41 will be cleared when the BNE instruction is processed; if the predetermined character is found, the Z flag 41 will be set when the BNE instruction is processed. Thus, this central processor condition code indicates success or failure. It now also will be apparent that subsequent programming to be used if the test is successful can utilize the information in the R0 and R1 registry to identify precisely the location of the character in the string and in the memory 11.

2. CMPC instruction

Prior to using a CMPC instruction, the programmer must transfer the length and first charcter address for the first or character string into the R0 and R1 registers and the length and first character address for the second character string into the R2 and R3 registers in the register memory 22. A fifth operation transfers a fill character into the low-order byte of the R4 register. When the CMPC instruction is retrieved in accordance with the processing set forth in FIGS. 2 and 3, step 78 in FIG. 3 branches to step 101 in FIG. 6A-1.

In step 101 the central processor compares the length of the first and second character strings by examining the contents of the R0 and R2 registers in the register memory 22. If the first character string is longer, the number in the R0 register will be larger than the number in the R2 register, so the central processor 10 uses step 102 to divert to step 103 which transfers the length of the shorter character string into the SOURCE register. Then, in step 104, the central processor establishes interruption return information that will be utilized should this instruction be suspended during subsequent operations.

In step 105 the central processor 10 decrements the R2 register thereby to decrement the string length number for the second character string and then tests the contents of the R2 register in step 106 to determine whether all the characters in the string have been compared. If they have, the central processor 10 branches from step 106 to the sequence shown in FIG. 6B. Otherwise, the central processor 10 moves the next character in the second character string into the low-order byte of the BA register in step 110 and the corresponding character from the first character string into the high-order byte of the STATUS register during step 111. Next the central processor 10 determines whether any interruptions have occurred that need to be serviced in the same manner as the central processor 10 performs this operation in connection with the character retrieval routine of FIG. 4. If an interruption does exist, step 112 branches to step 113; otherwise step 112 branches to step 114A so the two characters are compared. If the characters are identical, the central processor adjusts the addresses of the character strings contained in the R1 and R3 registers in register memory 22 to point to the next pair of characters in the strings (step 114B) and returns to step 105. Thus, steps 105 through 114B constitute a loop that is processed iteratively until different characters are detected. When such a difference is detected, the central processor 10 diverts to step 115 and decrements the contents of the R1 and R3 registers so those registers contain the address of the characters that actually were tested and found to be different. In step 116 the string lengths are incremented in the R0 and R2 registers so that the position of those characters in their respective strings is recorded. When this is completed, the central processor 10 shifts to step 96 if FIG. 5 for completion.

Figures 2, 6B:
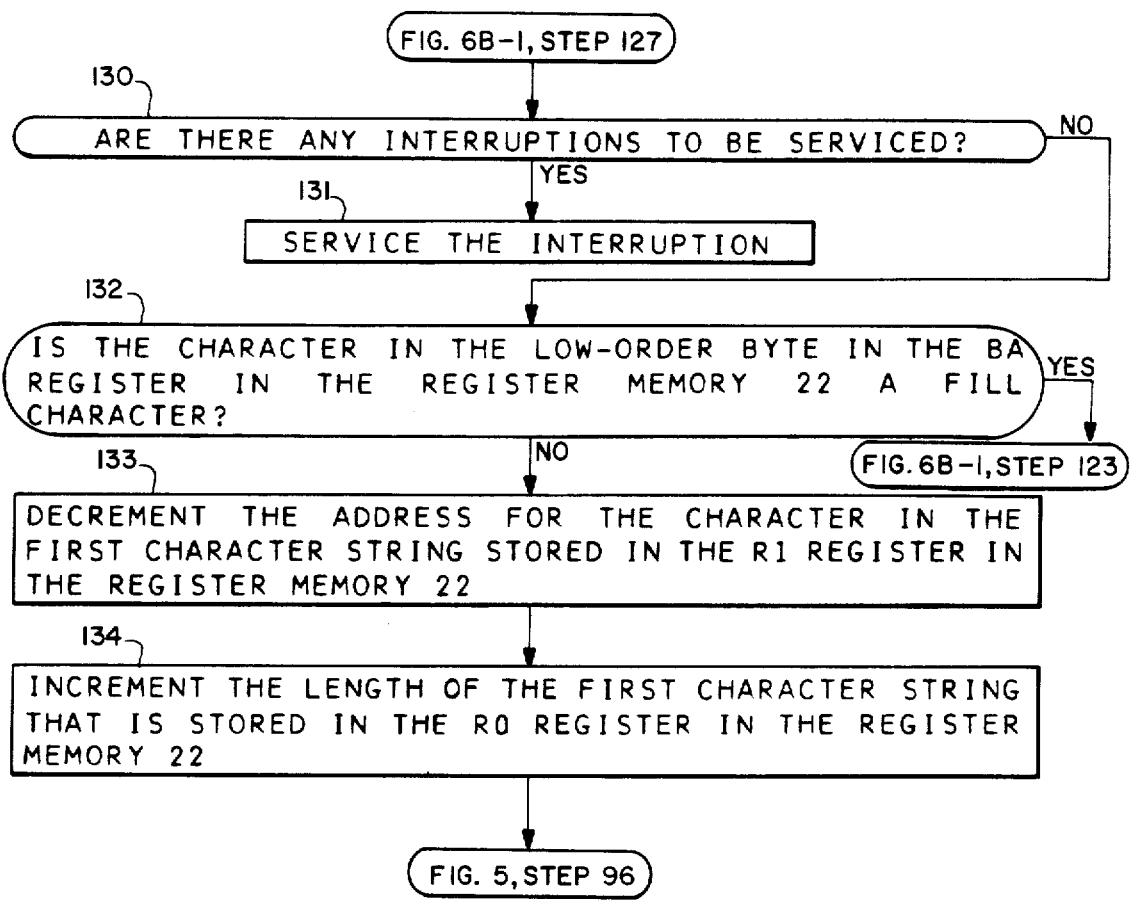
Figure 6C:
Figure 2:
Figure 6D:
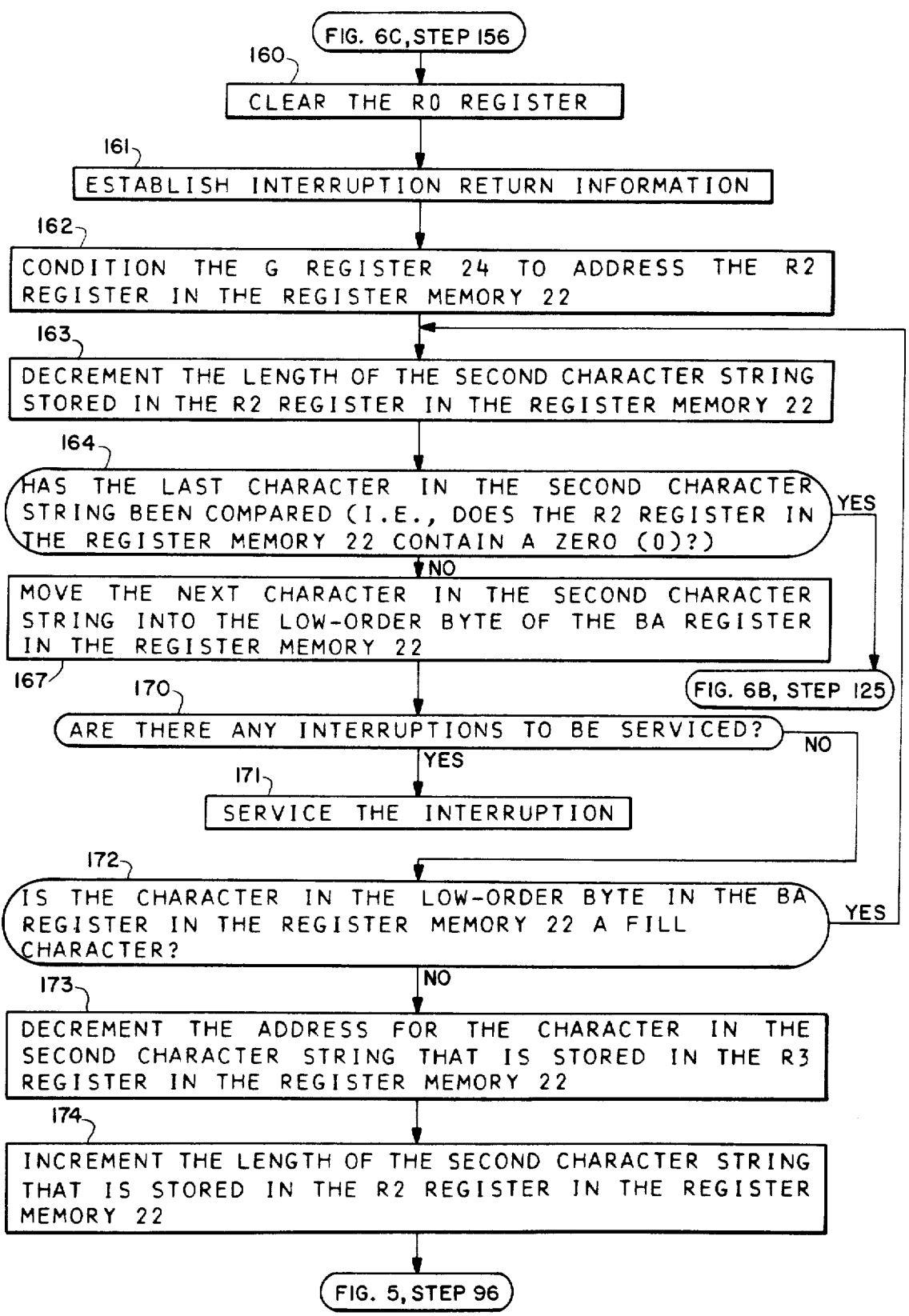

Still referring to the sequence in FIG. 6A-1, once all the characters in the second, or shorter, character string are retrieved and found to be identical to the corresponding characters in the first string, during the next iteration the R2 register will be decremented to a negative number whereupon step 106 in FIG. 6A-1 transfers to step 120 in FIG. 6B to clear the R2 register by incrementing its contents to ZERO. After the central processor 10 establishes return information for an interruption in step 121, it utilizes step 122 to condition the G register 24 to address the R0 register which contains the number corresponding to the number of characters remaining in the first, or longer, character string. Then in step 123 the central processor 10 decrements this length and, in step 124 tests the contents in the R0 register to determine whether the last character in the first character string has been compared. If it has, the central processor 10 clears the R0 register in step 125 and clears the C flag 44 in step 126. Then the central processor 10 diverts to steps 96 and 97 in FIG. 5.

So long as additional characters in the first character string have not been examined, they are transfered in succession into the BA register in step 127. Once this transfer is made, step 130 is used to test for the presence of interruptions. Then the central processor 10 diverts to step 131 if an interruption exists. If no interruption exists, step 130 diverts to step 132 whereupon the character that has been retrieved from the first character string is compared with the fill character. If the retrieved character in the first character string corresponds to a fill character, the central processor returns to step 123 thereby to process the next character during the next duration of a loop comprising steps 123 and 132. This iterative processing continues either until a character not corresponding to a fill character is retrieved or the last character in the first character string has been compared. If a character not corresponding to the fill character is retrieved, the central processor 10 diverts from step 132 to steps 133 and 134 whereupon it decrements the R1 register and increments the R0 register so that the memory address and position in the character string of that character are recorded. Then the central processor diverts to steps 96 and 97 shown in FIG. 5.

Referring again to FIG 6A-1, in step 102 the lengths of the two character strings are compared. When the entire first character string has a shorter or equal length to the second string, step 102 in FIG. 6A causes the central processor 10 to divert to step 144 in FIG. 6C. The sequence of steps in FIGS. 6C and 6D includes steps 144 through 174 that are analogous to steps 104 through 134 in FIGS. 6A and 6B. The steps in FIGS. 6C and 6D essentially differ only to compensate for the fact that the controlling character string length (i.e., the length of the shorter string) is the contents of the R2 register, rather than R0 register.

If the shorter string is completely processed then the condition codes again contain information that the programmer uses to control subsequent operations. If the respective lengths of two strings are compared, the C flag will be cleared if the first string is shorter than the second. The programmer uses a BLO instruction to test the condition of the C flag 44. A BEQ instruction tests the Z flag and branches if the two strings are of equal length while a BHI instruction tests the Z flag 41 and C flag 44 and branches if the first string is longer than the second string. Thus, these conventional program control instructions determine whether the two strings have equal lengths can be determined by using a BEQ instruction to test for success and a BNE instruction to test for failure.

3. SCANC and SPANC instructions

The flow diagram of FIG. 7 describes the operation of the central processor unit depicted in FIG. 1 in response to the receipt of a SCANC instruction. As has been noted above, this instruction treats the elements of the character string identified by the contents of the R1 register as an offset into a table in memory which has a base address contained in register R5. After performing a logical operation on the character retrieved from the table and the reference character stored in the R4 register, the processor either exits or performs further iterations on other characters in the character string. The operation of the processor in response to the SPANC instruction, which is the other instruction referencing a table in memory, will be readily apparent from FIG. 7 and the description of the SPANC instruction above.

CONCLUSION

We have disclosed a specific embodiment of a central processor and the modifications to that central processor that are necessary to implement two specific character string instructions. In both examples, the instructions test for some predetermined characteristic. A LOCC instruction tests for the existence of a predetermined character in a character string while the CMPC instruction tests to determine whether the two strings either are identical or have equal lengths. In both these instructions, the success or failure of the test with respect to a character string or character strings is readily ascertained by using conventional program control instructions to test the central processor condition flags which, in this specific embodiment, constitute the condition codes for the central processor. The specific implementations of the remaining instructions that have been defined functionally are not included. It will be apparent from those functional specifications that they are essentially modifications of the two specifically disclosed instructions. Therefore understanding of this specific implementation of the LOCC and CMPC instructions will enable a person of ordinary skill in the art to implement those remaining character string instructions and other instructions of a similar nature.

While this invention has been described in terms of an LSI11 central processor manufactured by the assignee of this invention, it will be apparent that this invention can be implemented in connection with other central processors of a similar or diverse architecture. For example, one might apply this invention to another PDP11 central processor having the same basic architecture by utilizing a separate microprogrammed controlled central processor unit for executing only these character string instructions. Such a special processor would then be activated whenever the instruction decoder responded to any instruction in the character string instruction class. Therefore, it is the object of the appended claims to cover all such variations and modifications as come within the true spirit and scope of this invention.

What we claim as new and desire to secure by Letters Patent of the United States is:

1. A processor for use in a data processing system including a memory for storing instructions, and data, said processor including processing means for processing data in response to the instructions and processor status means connected to the processing means for storing a condition code that reflects conditions in the processing means upon completion of each instruction, said processor further including:

a. first and second address storage means coupled to said processing means each for storing an address of a character in a character string, each of said address storage means initially receiving from said processing means an address of the first character in the character string;

b. first and second string length storage means coupled to said processing means each for storing values identifying the number of characters remaining in a corresponding character string, each of said string length storage means initially receiving from said processing means a value corresponding to the number of characters in the corresponding character string;

c. retrieval means connected to said first and second address storage means, coupled to said processing means and responsive to a character string instruction for enabling said processing means to iteratively retrieve characters from both character strings from said memory at locations identified by the addresses stored in said first and second address storage means during each of a succession of retrieval operations, d. comparison means connected to said retrieval means and coupled to said processing means for enabling said processing means to compare, after each retrieval operation, the characters from each character string as retrieved by said retrieval means;

e. altering means comprising means coupled to said processing means and connected to both said address storage means and both said string length storage means for (i) altering both said address storage means to point to the next characters in both said character strings and further altering said string length storage means of at least the storage means storing the length of the shorter string if said processing means determines that the character match, and (2) resetting the contents of said first address storage means to be initial address and said first string latch storage means to the initial value and altering the contents of said second address storage means and said second string length storage means if said processing means determines that the retrieved characters do not match, the amount by which the second address storage means and said second string length storage means are altered being determined by the number of prior matches of characters in the character strings; and f. testing means coupled to said processor means and said comparison means for establishing the condition code in said processor status means in response to successful and unsuccessful comparisons by said comparison means; whereby the Processor can make use of the condition code in processing of instructions subsequent to the character string instruction to determine the existence of the predetermined characteristic in the character string, and the contents of both said address storage means and both said string length storage means identify the locations of the matching strings in the memory.

2. A processor for use in a data processing system including a memory for storing instructions and data including table means for storing characters and a string of offset addresses, said processor including processing means for processing data in response to the instructions, processor status means connected to the processing means for storing a condition code that reflects conditions in the processing means upon completion of each instruction and base address storage means for storing the base address of said table means in said memory, said processor further including:
  a. means for storing a predetermined characteristic;
  b. retrieval means coupled to said processing means and response to a character string instruction for enabling said processing means to iteratively retrieve characters from said table means during each of a succession of retrieval operations, including:
    i. address storage means for receiving an initial address in memory of the first offset address in a string of offset addresses;
    ii. string length storage means for receiving a number identifying the number of offset addresses in the offset address string;
    iii. offset address retrieval means connected to said address storage means for enabling said processing means to retrieve an offset address from said offset address string at the location identified by the contents of said address storage means;
    iv. means connected to said address storage means and said string length storage means responsive to the retrieval of an offset address for altering the contents of said address storage means and said string length storage means to identify the next offset address in the string;
    v. character retrieval means connected to said base address storage means and said offset address retrieval means for retrieving a character from said table means at the location in said table means identified by the contents of said base address storage means as offset by the retrieved offset address;
  c. comparison means coupled to said characteristic storage means, said retrieval means and said processing means for causing the processing means to compare, after each character retrieval operation, the retrieved character and the predetermined characteristic; and
  d. testing means coupled to said comparison means and said processor status means for establishing the condition code in said processor status means in response to the successful and unsuccessful comparisons by said comparison means; whereby the processor can make use of the condition code in processing of instructions subsequent to the character string instruction to determine the existence of the predetermined characteristic in the character string, and the contents of said address storage means, string length storage means and base address storage means to identify the location of the matching character in the table in memory.

3. A processor as defined in claim 1 wherein said base address storage means comprises a register means.

4. A processor as defined in claim 1 wherein said testing means comprises:
  a. first disabling means connected to said string length storage means and said retrieval means for testing the contents of said string length storage means to determine when all of the offset addresses in the offset address string have been retrieved and for disabling said retrieval means when all of the offset addresses in the string have been retrieved; and
  b. second disabling means connected to said comparison means and said retrieval means for disabling said retrieval means when the retrieved character matches the predetermined characteristic.

* * * * *